United States Patent
Lee et al.

(10) Patent No.: US 9,798,407 B2
(45) Date of Patent: Oct. 24, 2017

(54) HIGH-SENSITIVITY IN-CELL TOUCH DISPLAY DEVICE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 78 days.

(21) Appl. No.: 15/065,411

(22) Filed: Mar. 9, 2016

(65) Prior Publication Data

US 2016/0266694 A1 Sep. 15, 2016

(30) Foreign Application Priority Data

Mar. 10, 2015 (TW) .............................. 104107533 A (51) Int. Cl.
| | |
|---|---|
| *G06F 3/041* | (2006.01) |
| *G06F 1/32* | (2006.01) |
| *G06F 3/044* | (2006.01) |
| *G09G 3/36* | (2006.01) |

(52) U.S. Cl.
CPC .......... *G06F 3/0412* (2013.01); *G06F 1/3262* (2013.01); *G06F 3/044* (2013.01); *G06F 3/0416* (2013.01); *G09G 3/3696* (2013.01)

(58) Field of Classification Search
CPC ............................................ G06F 3/041–3/047
See application file for complete search history.

(56) References Cited

U.S. PATENT DOCUMENTS

| | | | |
|---|---|---|---|
| 2012/0062516 A1* | 3/2012 | Chen ..................... | G06F 3/016 345/174 |
| 2012/0086665 A1 | 4/2012 | Song | |
| 2013/0314342 A1 | 11/2013 | Kim et al. | |
| 2013/0328829 A1* | 12/2013 | Lee ....................... | G06F 3/0412 345/174 |
| 2014/0062907 A1 | 3/2014 | Kim | |

* cited by examiner

*Primary Examiner* — Gene W Lee
(74) *Attorney, Agent, or Firm* — Muncy, Geissler, Olds & Lowe, P.C.

(57) ABSTRACT

A high-sensitivity in-cell touch display device has a common voltage and sensing electrode layer including a plurality of common voltage and sensing electrodes, each corresponding to at least one pixel electrode. A touch circuit is provided with a touch-dedicated power supply circuit, and a common voltage and sensing electrode is used as a common node of the touch circuit and a display circuit, so that there is no current loop between the touch circuit and the display circuit. Reflection electrodes are further provided to reduce parasitic capacitance between the common voltage and sensing electrodes and to improve the sensing distance. The display operation and the touch sensing operation can be performed on different areas in parallel to increase respective efficiencies of the display and touch sensing operations.

15 Claims, 10 Drawing Sheets

HIGH-SENSITIVITY IN-CELL TOUCH DISPLAY DEVICE

BACKGROUND OF THE INVENTION

1. Field of the Invention

The present invention relates to the technical field of touch display devices and, more particularly, to a high-sensitivity in-cell touch display device.

2. Description of Related Art

A typical touch display device is provided by mounting a touch panel on a display panel with a complicated process and high material cost, which relatively reduces the light penetration rate and thus degrades the display quality. In addition, the additional volume and weight of the touch panel are disadvantageous to the trend of compactness and energy conservation and emission reductions for electronic devices. Accordingly, the in-cell touch display panels are getting more and more important in various industries.

In a typical in-cell touch display panel, in order to overcome the problem of having huge capacitance between a common electrode and the sensing electrodes, the common electrode is divided into a plurality of electrodes that are also operated as the touch electrodes. Furthermore, in order to overcome the severe SNR deterioration caused by a display signal coming from the TFT layer connection, a time sharing is applied for a touch sensing in a short display silent interval (vertical or horizontal synchronous interval) of a non-display operation, which can be seen in US patent publications US2014062907 entitled "Display device with an integrated touch screen and method of driving the same", US2012086665 entitled "Liquid crystal display device", and US2013314342 entitled "Touch sensing device and method for driving the same", for example. In the aforementioned typical in-cell touch display panels, when the resolution of the screen is increased, the display operation is difficult to have enough time for a touch sensing operation. Likewise, when the size of the screen is enlarged, the number of touch points is relatively increased and thus more time is required to scan the touch sensing electrodes. Accordingly, time division becomes difficult, resulting in that the resolution of the in-cell touch screen is limited and the size of the screen is restricted.

Therefore, it is desirable to provide an improved in-cell touch display device to mitigate and/or obviate the aforementioned problems.

SUMMARY OF THE INVENTION

The object of the present invention is to provide a high-sensitivity in-cell touch display device, which can provide a touch circuit with a touch-dedicated independent power supply circuit and use a common voltage and sensing electrode as a common node of the touch circuit and a display circuit. Thus, there is no current loop between the touch circuit and the display circuit, so that the relative voltage level of the display circuit has no influence to the relative voltage level of the touch circuit. In addition, reflective deflection electrodes are provided to reduce parasitic capacitance between the common voltage and sensing electrodes and to improve the sensing distance, thereby providing relatively stable and consistent voltage for the common voltage and sensing electrode. As a result, the disturbance to the display quality caused by the touch operation can be minimized, and a display operation and a touch sensing operation can be performed on different areas in parallel so as to increase respective efficiencies of the display and touch sensing operations.

To achieve the object, a high-sensitivity in-cell touch display device is provided, which includes: a first substrate; a second substrate arranged in parallel with the first substrate; a display material layer disposed between the first substrate and the second substrate; a thin film transistor layer arranged on one surface of the second substrate facing the display material layer and having a plurality of thin film transistors, a plurality of pixel electrodes, a plurality of gate driving lines, and a plurality of source driving lines; a common voltage and sensing electrode layer including a plurality of common voltage and sensing electrodes, each corresponding to one or more pixel electrodes, the common voltage and sensing electrodes being alternately grouped into a display area and a touch area, the display area and the touch area being respectively performed with a display operation and a touch sensing operation in parallel; a display circuit including: a display signal driving circuit, and a display power supply; and a touch circuit including: an independent touch-dedicated power supply, wherein there is no current loop between the ouch-dedicated power supply and the display circuit in a touch sensing operation mode, and a plurality of touch selection switch circuits for sequentially or dynamically selecting a part of the common voltage and sensing electrodes as one or more sensing electrode sets; wherein the display circuit and the touch circuit apply a display common voltage signal to the common voltage and sensing electrodes of the display area, and a touch sensing signal to the common voltage and sensing electrodes of the touch area, respectively.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
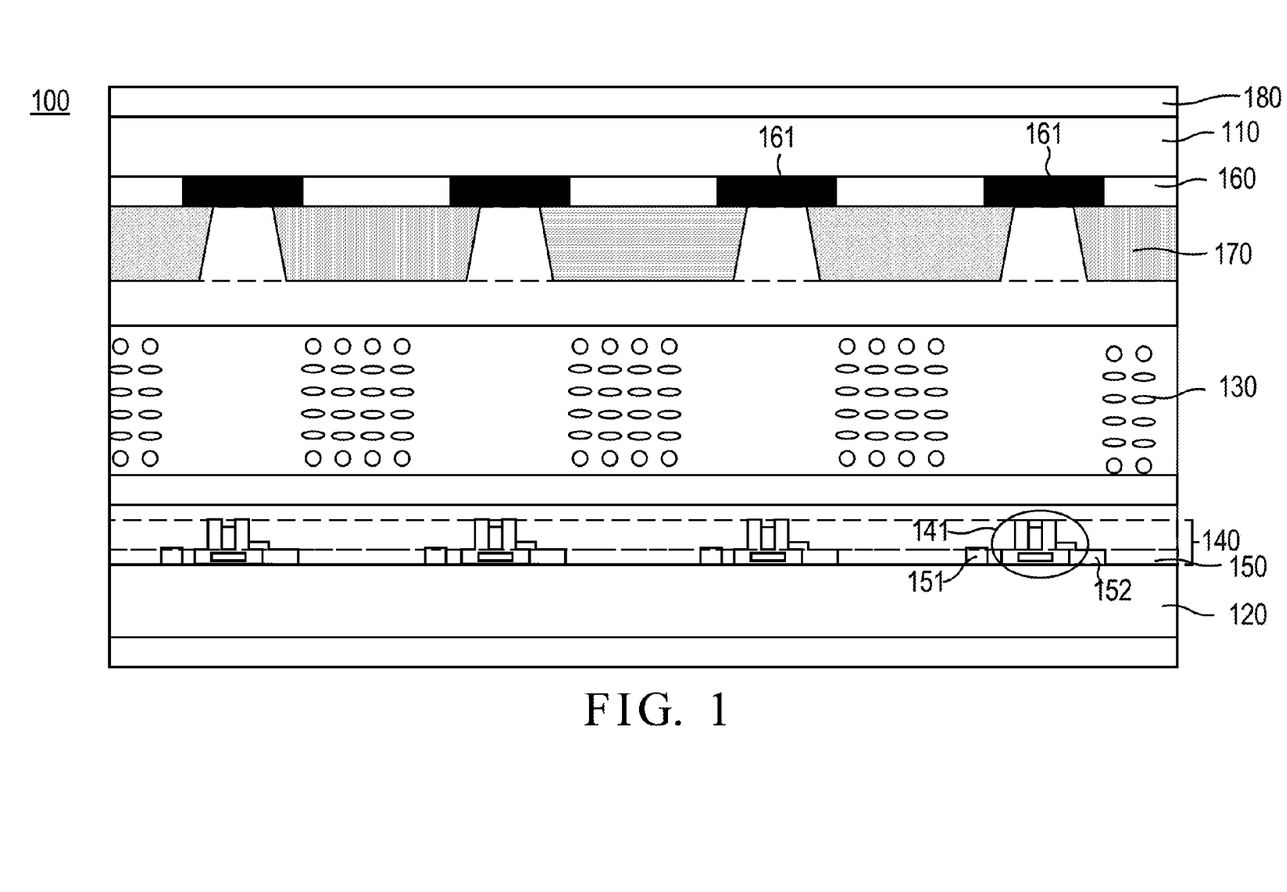
FIG. 1 schematically illustrates a stacked diagram of a high-sensitivity in-cell touch display device according to the invention.

FIG. 1 schematically illustrates a stacked diagram of a high-sensitivity in-cell touch display device 100 according to the invention. The high-sensitivity in-cell touch display device 100 includes a first substrate 110, a second substrate 120, a display material layer 130, a thin film transistor (TFT) layer 140, a common voltage and sensing electrode layer 150, a black matrix layer 160, a color filter layer 170, and a polarization layer 180.

The first substrate 110 and the second substrate 120 are preferably glass or polymer thin film substrates. The first substrate 110 and the second substrate 120 are arranged in parallel and the display material layer 130 is disposed between the first and second substrates 110, 120. In this embodiment, the display material layer 130 is a liquid crystal layer.

The TFT layer 140 is arranged on one surface of the second substrate 120 facing the display material layer 130. The TFT layer 140 is provided with a plurality of thin film transistors (TFTs) 141, a plurality of pixel electrodes, a plurality of gate driving lines, and a plurality of source driving lines. The gate and the source driving lines define a plurality of pixel areas each corresponding to a light penetration block.

The gate of the TFT 141 is connected to a gate driving line (not shown). Based on different driving circuit designs, the drain/source of the TFT 141 is connected to a source driving line (not shown), and the source/drain is connected to a pixel electrode 152 of a corresponding pixel area. The pixel electrode 152 and a corresponding common voltage and sensing electrode 151 form a capacitance. By changing the voltage of the capacitance, a deflected angle of the liquid crystals is changed. The gate and the source driving lines are not shown in the figures as they are well-known in the typical flat displays.

The common voltage and sensing electrode layer 150 includes a plurality of common voltage and sensing electrodes 151 for sensing a touch or an approach of an external object. Each of the common voltage and sensing electrodes 151 corresponds to at least one pixel electrode, and the common voltage and sensing electrodes 151 are alternately grouped into a display area and a touch area. The display area and the touch area are respectively provided to perform a display operation and a touch sensing operation in parallel. In FIG. 1, an in-panel switching (IPS) panel is given as an example for description, and thus the common voltage and sensing electrode 151 are arranged at a side of the TFT 141. As the IPS panel is applied, the common voltage and sensing electrode layer 150 is disposed between the second substrate 120 and the display material layer 130.

Figure 2:
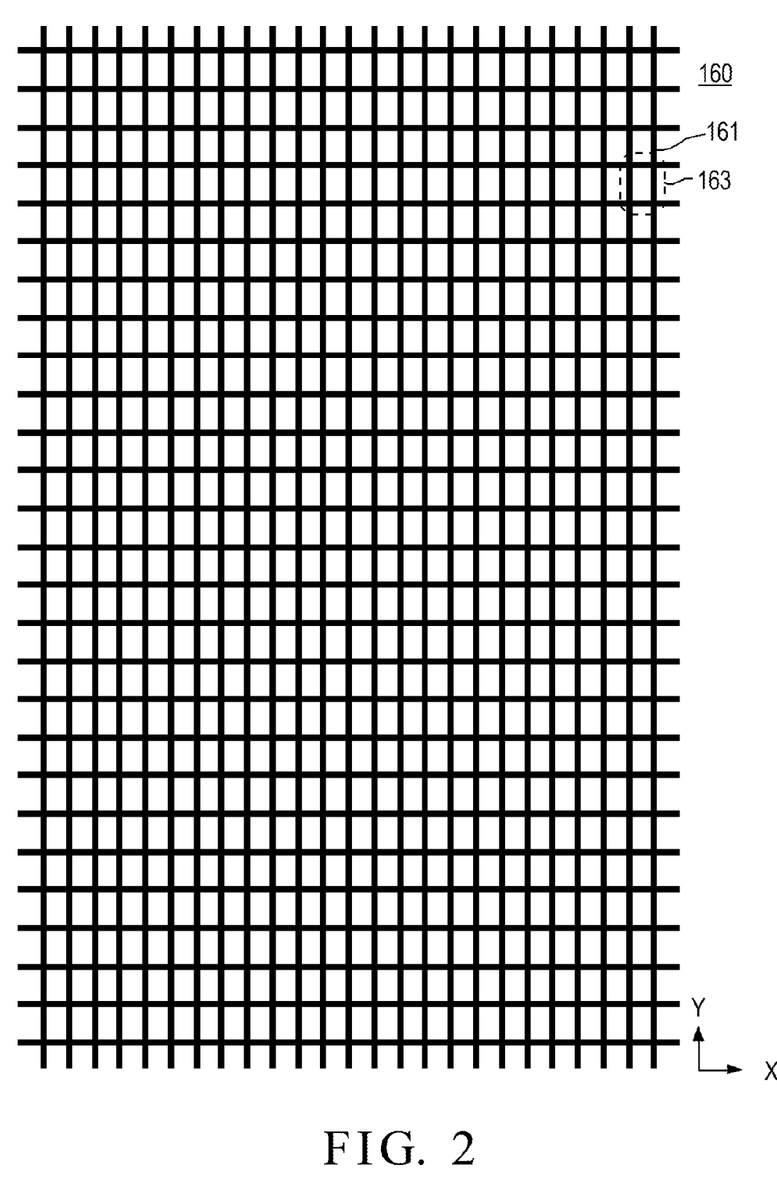
FIG. 2 is a schematic view of a black matrix layer according to the invention.

The black matrix layer 160 is disposed at one surface of the first substrate 110 facing the display material layer 130. FIG. 2 is a schematic view of the black matrix layer 160, which is the same as that of the prior LCD panel. As shown in FIG. 2, the black matrix layer 160 is composed of a plurality of light-shielding lines 161. The light-shielding lines 161 are arranged in a first direction (X-axis direction) and a second direction (Y-axis direction) to form a plurality of light penetration blocks 163. The light-shielding lines 161 are made of black insulating material. Furthermore, the light-shielding lines 161 are arranged corresponding to the positions of the gate and source driving lines, and the first direction is perpendicular to the second direction.

The color filter layer 170 is disposed at one surface of the black matrix layer 160 facing the display material layer 130. The polarization layer 180 is disposed at tone surface of the first substrate 110 opposite to the other surface of the first substrate 110 facing the display material layer 130.

The high-sensitivity in-cell touch display device 100 further includes a display circuit 310 and a touch circuit 330.

Figure 3:
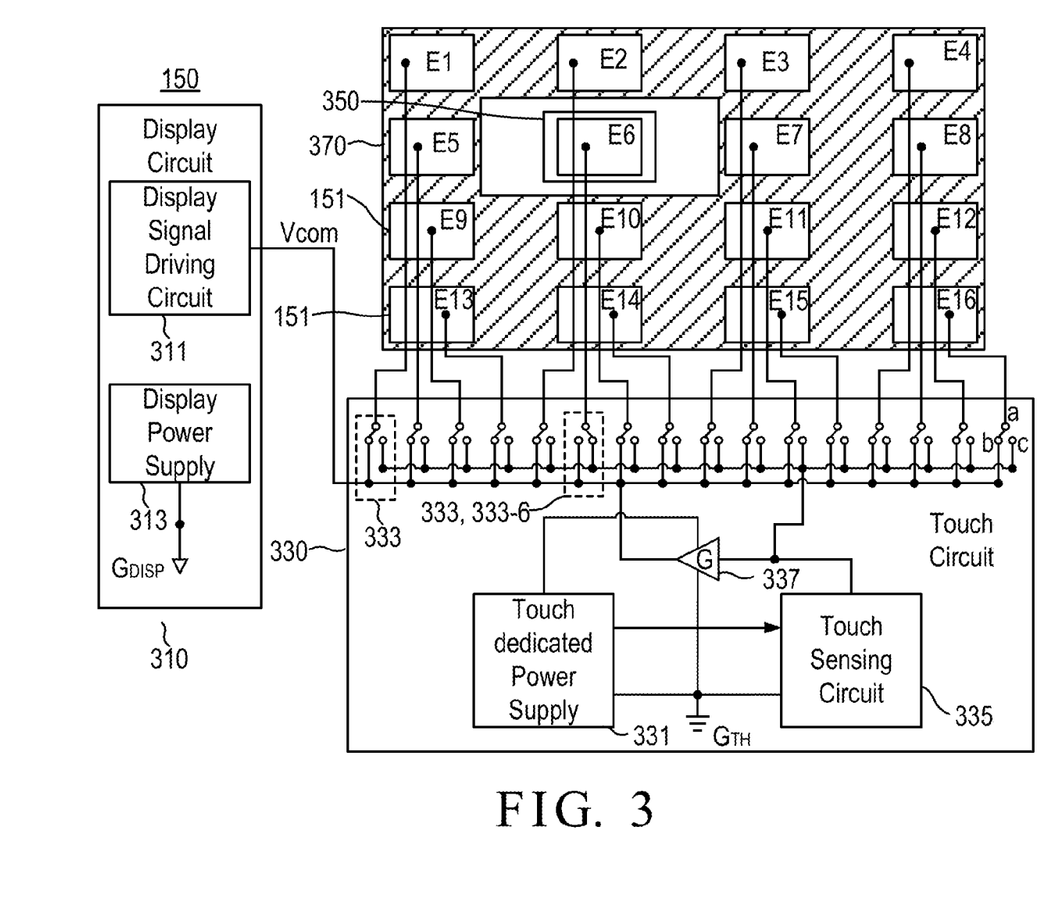
FIG. 3 is a schematic view of a common voltage and sensing electrode layer, a display circuit, and a touch circuit according to the invention.

FIG. 3 is a schematic view of the common voltage and sensing electrode layer 150, the display circuit 310, and the touch circuit 330 according to the invention. As shown in FIG. 3, the common voltage and sensing electrode layer 150 is provided with 16 common voltage and sensing electrodes 151, which is for illustrative purpose only, but not for limitation.

The display circuit 310 includes a display signal driving circuit 311 and a display power supply 313.

The touch circuit 330 includes a touch-dedicated independent power supply 331, a plurality of touch selection switch circuits 333, a touch sensing circuit 335, and at least one amplifier 337 with a gain greater than zero. In a touch sensing operation mode, there is no current loop existed between the touch-dedicated independent power supply 331 and the display circuit 310. The touch selection switch circuits 333 are provided to sequentially or dynamically divide the common voltage and sensing electrodes 151 into at least one sensing electrode set and at least one deflection electrode set. The display circuit 310 applies a display common voltage signal (Vcom) to the common voltage and sensing electrodes 151 of the display area, and the touch circuit 330 applies a touch sensing signal to the common voltage and sensing electrodes 151 of the touch area.

The touch selection switch circuits 333 are provided to sequentially or dynamically divide the common voltage and sensing electrodes 151 into at least one sensing electrode set 350 and at least one deflection electrode set 370. As shown in FIG. 3, a touch selection switch circuit 333-6 has a first terminal (a) connected to a third terminal (c), and each of the other touch selection switch circuits 333 has a first terminal (a) connected to a second terminal (b). As a result, the sensing electrode set includes the common voltage and sensing electrode 151 (E6), and the deflection electrode set includes the common voltage and sensing electrodes 151 (E1-E5, E7-E16).

As shown in FIG. 3, the touch selection switch circuits 333 couple an electrical signal of the selected common voltage and sensing electrode 151 (E6) of the sensing electrode set 350 to an input terminal of the corresponding at least one amplifier 337 with a gain greater than zero, and couple a reflective deflection signal outputted by the at least one amplifier 337 with a gain greater than zero to the common voltage and sensing electrodes 151 (E1-E5, E7-E16) of the deflection electrode set 370. Namely, the common voltage and sensing electrode 151 (E6) of the sensing electrode set is electrically connected to the touch sensing circuit 335 for performing a touch sensing. The common voltage and sensing electrodes 151 (E1-E5, E7-E16) of the deflection electrode set is electrically connected to an output terminal of the at least one amplifier 337 with a gain greater than zero for receiving the reflective deflection signal outputted by the amplifier 337 with a gain greater than zero.

In FIG. 3, the sensing electrode set 350 includes only one common voltage and sensing electrode 151 (E6). In other embodiments, the sensing electrode set 350 may include a plurality of common voltage and sensing electrodes 151. As shown in FIG. 3, the deflection electrode set 370 is composed of all the common voltage and sensing electrodes 151 (E1-E5, E7-E16) except the common voltage and sensing electrode (E6) of the corresponding sensing electrode set 350.

The grounding terminal for the display signal driving circuit 311 and the display power supply 313 is denoted as a first ground $G_{DISP}$. The display signal driving circuit 311 is connected to the gate driving lines and the source driving lines of the TFT layer 140 for performing an image display.

Figure 4:
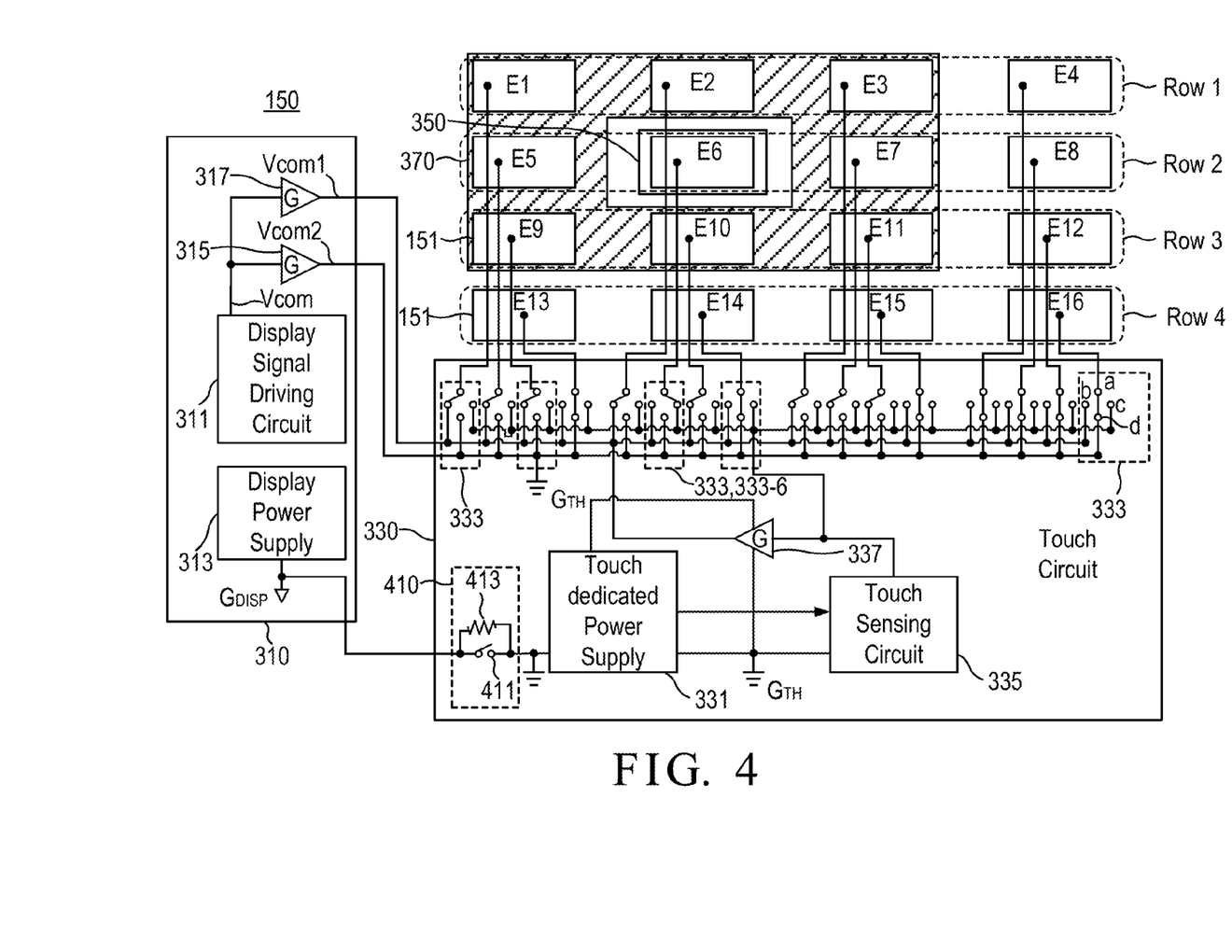
FIG. 4 is another schematic view of a common voltage and sensing electrode layer, a display circuit, and a touch circuit according to the invention.

FIG. 4 is another schematic view of the common voltage and sensing electrode layer 150, the display circuit 310, and the touch circuit 330 according to the invention. As shown in FIG. 4, different from that of FIG. 3, the touch circuit 330 further includes a switching device 410. The switching device 410 is a switch 411 capable of being switched to connect or disconnect its two end, or the switching device 410 may include the switch 411 and a high-impedance element 413 connected onto the two ends of the switch 411. In this embodiment, the switching device 410 includes the switch 411 and the high-impedance element 413 connected onto the two ends of the switch 411.

The touch circuit 330 is powered by a touch-dedicated power supply 331, which is different from the display power supply 313. The grounding terminal of the touch circuit 330 and the touch-dedicated power supply 331 is denoted as a second ground $G_{TH}$. The touch sensing circuit 335 is connected to the common voltage and sensing electrodes 151 for driving the common voltage and sensing electrodes 151 to sense a finger's touch. When a touch sensing operation is performed, there is no direct current loop existed between the display power supply 313 and the touch-dedicated power supply 331, or there is only a very weak current loop generated through a high-impedance element.

In a non-touch operation mode, the independent touch-dedicated power supply 331 is coupled to the display power supply 313 and the display circuit 310 through the switching device 410 so as to send a synchronous message and touch information or perform a power charging operation.

In this embodiment, the switching device 410 is connected between the grounding terminal of the display power supply 313 and the grounding terminal of the touch-dedicated power supply 331 so as to control disconnection and connection of the grounding terminals of the display power supply 313 and the touch-dedicated power supply 331. Namely, when performing the touch sensing operation, the display power supply 313 is disconnected from the touch-dedicated power supply 331, and thus there is no current loop existed therebetween. When performing a non-touch operation, the display power supply 313 is connected to the touch-dedicated power supply 331, and thus there is a common current loop.

The switching device 410 at least includes a switch 411. The switch 411 is a transistor switch. Alternatively, the switching device 410 may further include a high-impedance element 413 connected over the switch 411 to prevent an electrostatic voltage difference from being generated between the display circuit 310 and the touch circuit 330. The high-impedance element 413 can be a resistor with a resistance more than 100KΩ. The on/off operation of the switch 411 can be controlled by the touch sensing circuit 335. in other embodiments, the on/off operation of the switch 411 can be controlled by the display signal driving circuit 311. As shown in FIG. 4, the deflection electrode set 370 is composed of the common voltage and sensing electrodes 151 (E1-E3, E5, E7, E9-E11) surrounding the corresponding sensing electrode set 350. The deflection electrode set 370 is electrically connected to the reflective deflection signal of the touch circuit 330 and a first display common voltage signal Vcom1 of the display circuit 310 at the same time. The remaining common voltage and sensing electrodes 151 (E4, E8, E12, E13-E16) are grouped as another deflection electrode set, which is electrically connected to the second ground GT1-1 of the touch circuit 330 and a second display common voltage signal Vcom2 of the display circuit 310 at the same time, where Vcom1 and Vcom2 are an equal voltage signal. Since Vcom1 and Vcom2 are outputted respectively by the amplifiers 317 and 315 which are driven by respective common voltages, it can be deemed as an open circuit (no current loop) when being viewed from the touch circuit side. As shown in FIG. 4, corresponding to the common voltage and sensing electrodes 151 (E4, E8, E12, E13-E16) of the another deflection electrode set, the first terminal (a) of the touch selection switch circuit 333 is connected to the fourth terminal (d) thereof.

Figure 5A:
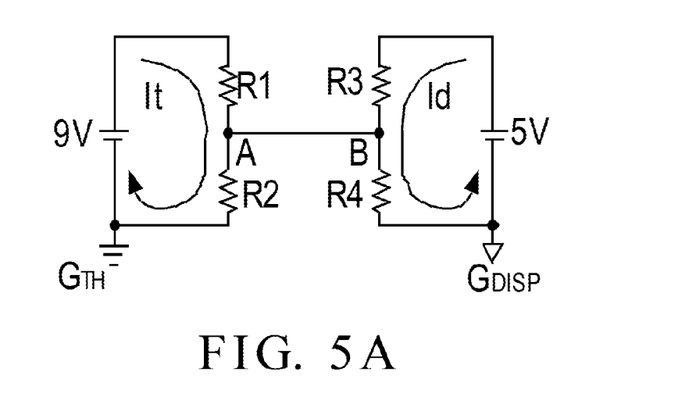
FIGS. 5A, 5B and 5C are schematic diagrams illustrating the operation principle of a display circuit and a touch circuit according to the invention.

FIG. 5A is a schematic diagram illustrating the operation principle of the display circuit 310 and the touch circuit 330 according to the invention. In FIG. 5A, the point A of the current loop circuit at the left side and the point B of the current loop circuit at the right side are connected together. Namely, there is only one common point (A/B) between the two circuits that have no common ground and no common power source, and in this case the point A can be regarded as same as the point B. As shown in FIG. 5A, the point A has a voltage of (9V*R2)/(R1+R2) relative to the second ground ($G_{TH}$), and the point B has a voltage of (5V*R4)/(R3+R4) relative to the first ground ($G_{DISP}$). Accordingly, the 5V power source for the circuit at the right side does not influence the circuit at the left side, and the 9V power source for the circuit at the left side does not influence the circuit at the right side.

Figure 5B:
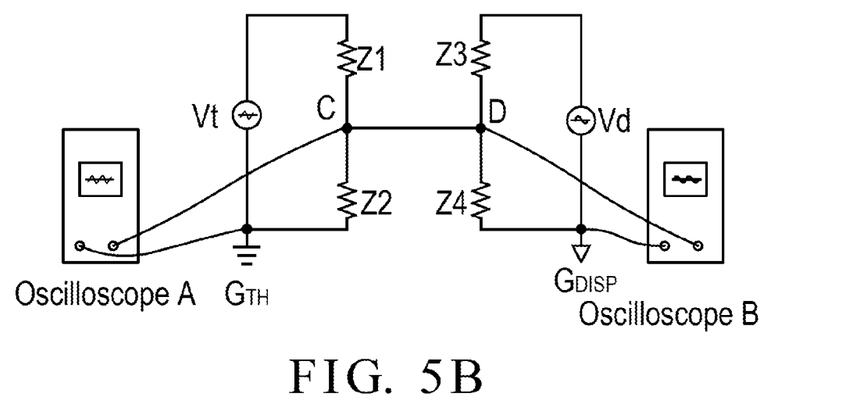

FIG. 5B is another schematic diagram illustrating the operation principle of the display circuit 310 and the touch circuit 330 according to the invention. As shown in FIG. 5B, there is only one connection point (point C is the same as point D) between the left-side circuit and the right-side circuit that have no common ground. The left-side circuit has an AC signal source Vt, which provides a triangle wave signal. The right-side circuit has another AC signal source Vd, which provides a sine wave signal. Since there is no common current loop between the left-side circuit and the right-side circuit, the oscilloscope (A) measures a triangle wave signal with an amplitude of (Vt*Z2)/(Z1+Z2) relative to the second grounding terminal $G_{TH}$ at the point C, which does not have any component of the sine wave signal source at the right side. Similarly, the oscilloscope (B) measures a sine wave signal with an amplitude of (Vd*Z4)/(Z3+Z4) relative to the first grounding terminal ($G_{DISP}$) at the point D, which does not have any component of the triangle wave signal source at the right side. Accordingly, the AC signals at the left side and the right side are not influenced to each other.

Figure 5C:
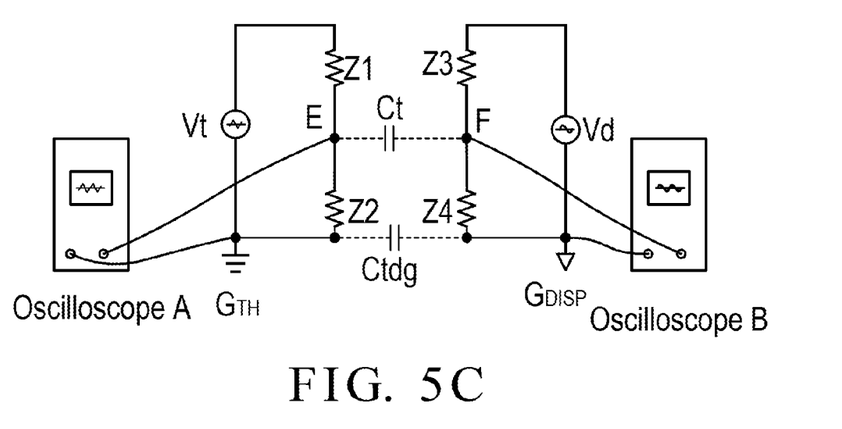

FIG. 5C is a further schematic diagram illustrating the operation principle of the display circuit 310 and the touch circuit 330 according to the invention. As shown in FIG. 5C, the left-side circuit and the right-side circuit have no common ground, no common current loop, and no connection, wherein Ct indicates a parasitic capacitance between the point E of the left-side circuit and the point F of the right-side circuit, and Ctdg indicates a parasitic capacitance between the ground (second grounding terminal) of the left-side circuit and the ground (first grounding terminal) of the right-side circuit. The left-side circuit includes an AC signal source Vt, which is a triangle wave signal, and the right-side circuit includes an AC signal source Vd, which is a sine wave signal. When Ctdg is very small, its impedance is almost infinite, so that the oscilloscope (A) measures a triangle wave signal with an amplitude of (Vt*Z2)/(Z1+Z2) relative to the second ground ($G_{TH}$) at the point E, which does not have any component of the sine wave signal source at the right side. Similarly, the oscilloscope (B) measures a sine wave signal with an amplitude of (Vd*Z4)/(Z3+Z4) relative to the first grounding terminal ($G_{DISP}$) at the point F, which does not have any component of the triangle wave signal source at the left side. Accordingly, the AC signals at the left side and the right side are not influenced to each other.

In FIGS. 5B and 5C, the left-side and the right-side AC signal sources Vt and Vd respectively represent individual activation signals of two circuits without common current loop, and noises superimposed on the power sources of the two circuits, which can be s combination of various frequencies and waveforms. The triangle wave and sine wave in the figures are for illustrative purpose only, but not for a limit.

From FIGS. 5A, 5B, and 5C, it is known that, when performing a touch sensing operation, the signal or noise on the display circuit 310 does not influence the touch circuit 330 since there is no common current loop between the display power supply 313 and the touch-dedicated power supply 331. Therefore, the noise on the touch circuit 330 can be reduced, and the sensitivity and accuracy of the touch circuit 330 can be increased in the touch sensing operation. Similarly, the touch sensing signal applied to the common voltage and sensing electrodes neither interferes with the display circuit 31 nor influences the voltage uniformity of the common voltage electrodes relative to the display electrodes.

Figure 6A:
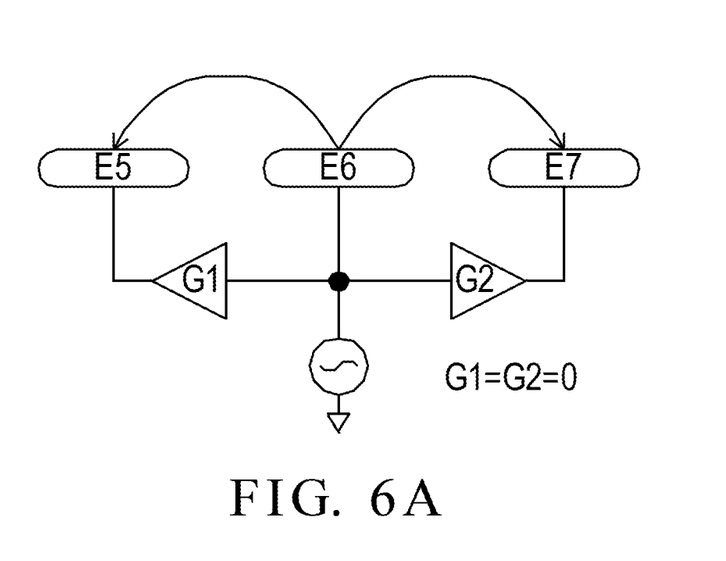
FIGS. 6A, 6B, 6C and 6D are schematic diagrams illustrating the operation principle of a sensing electrode set and a deflection electrode set according to the invention.
Figure 6B:
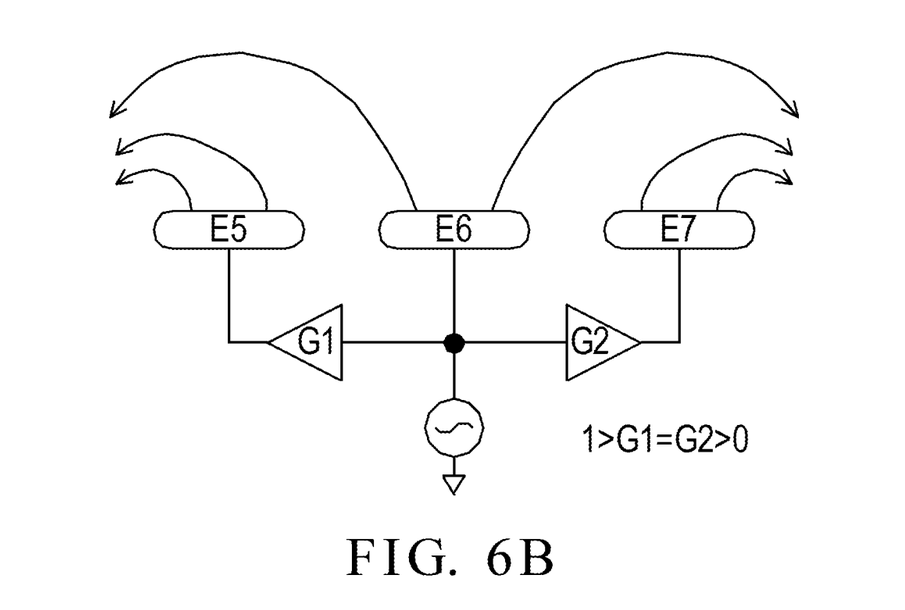
Figure 6C:
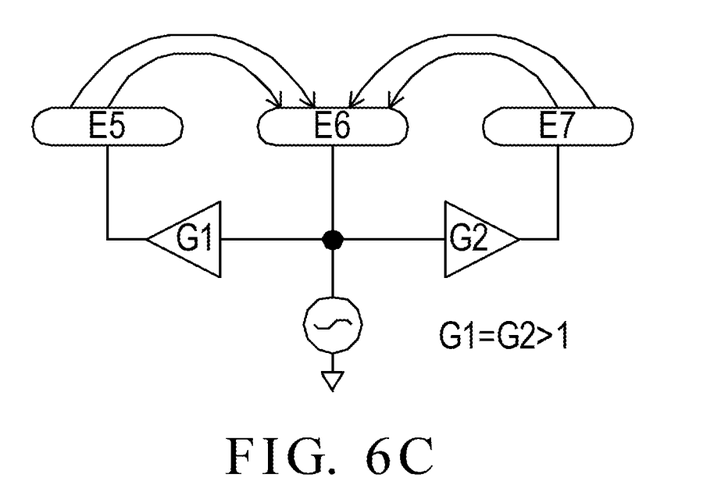
Figure 6D:
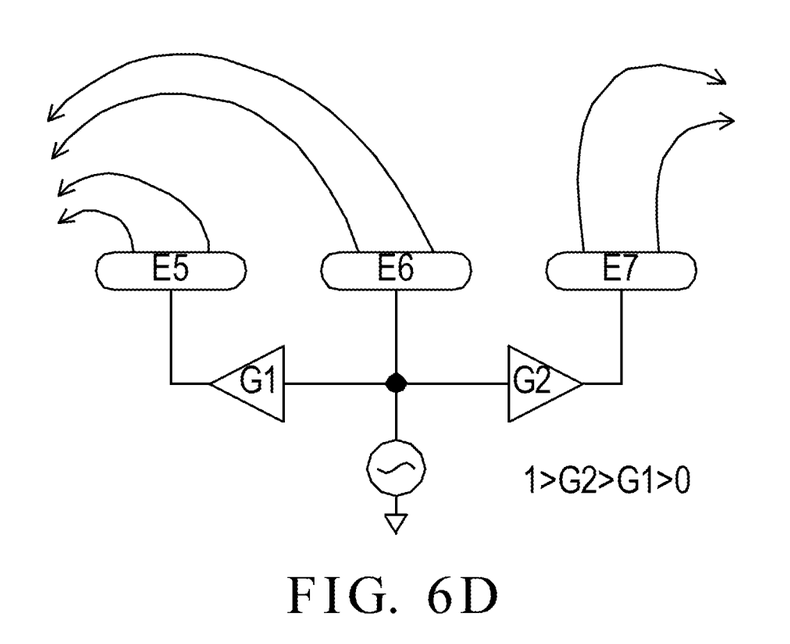

FIGS. 6A, 6B, 6C and 6D are schematic diagrams illustrating the operation principle of the sensing electrode set 350 and the deflection electrode set 370 according to the invention. As shown in FIG. 6A, when there is a touch sensing signal on the common voltage and sensing electrode 151 (E6) and there is no touch sensing signal on the common voltage and sensing electrodes 151 (ES, E7), the electric flux lines are irradiated from the common voltage and sensing electrode 151 (E6) to the common voltage and sensing electrodes 151 (ES, E7). As shown in FIG. 6B, when the common voltage and sensing electrode 151 (E6) is provided with touch sensing signal, and the common voltage and sensing electrodes 151 (E5, E7) are provided with touch sensing signal having the same polarity as that on the common voltage and sensing electrode 151 (E6), due to the mutual repulsion principle between like charges, the electric flux lines originated from the common voltage and sensing electrode 151 (E6) are extended farther due to the repulsion of the electric flus lines originated from the common voltage and sensing electrodes 151 (E5, E7). As shown in FIG. 6C, when the common voltage and sensing electrode 151 (E6) is provided with touch sensing signal and the common voltage and sensing electrodes 151 (ES, E7) are provided with greater touch sensing signal than that on the common voltage and sensing electrode 151 (E6), the electric flux lines are irradiated from the common voltage and sensing electrodes 151 (ES, E7) to the common voltage and sensing electrode 151 (E6). As shown in FIG. 6D, when the common voltage and sensing electrode 151 (E6) is provided with touch sensing signal, and the common voltage and sensing electrodes 151 (E5, E7) are provided with same-polarity and smaller touch sensing signal in comparison with that on the common voltage and sensing electrode 151 (E6), the electric flux lines originated from the common voltage and sensing electrodes 151 (E6, E5, E7) are irradiated outward, and the electric flux lines are pushed by the touch sensing signal of the common voltage and sensing electrode 151 (E7) are thus deflected toward the common voltage and sensing electrode 151 (E5), so that the electric flux lines originated from the common voltage and sensing electrode 151 (E6) are deflected and extended over the common voltage and sensing electrode 151 (E5).

From FIG. 6B, it is known that, when the touch selection switch circuits 333 couple an electrical signal of the selected common voltage and sensing electrode 151 (E6) of the sensing electrode set 350 to the input terminal of the corresponding at least one amplifier 337 with a gain greater than zero, and couple a reflective deflection signal outputted by the at least one amplifier 337 with a gain greater than zero to the common voltage and sensing electrodes 151 (E1-E5, E7-E16) of the deflection electrode set 370, the common voltage and sensing electrode 151 (E1) and the common voltage and sensing electrodes 151 (E1-E5, E7-E16) have the same electrical signal if the gains G1 and G2 are both equal to 1 (G1=G2=1). Thus, the equivalent capacitance between the common voltage and sensing electrode 151 (E6) and the common voltage and sensing electrodes 151 (E1-E5, E7-E16) is equal to zero. Accordingly, when the common voltage and sensing electrodes 151 (E1-E5, E7-E16) perform a display operation and the common voltage and sensing electrode 151 (E6) performs a touch sensing operation, it is able to eliminate the noise originated from the coupled parasitic capacitance between the common voltage and sensing electrode 151 (E6) and the common voltage and sensing electrodes 151 (E1-E5, E7-E16). In addition, the electric flux lines on the common voltage and sensing electrode 151 (E6) can be pushed upwardly, so that the touch sensing range is enlarged thereby further increasing the sensitivity and accuracy of the touch circuit 330 in the touch sensing operation. Preferably, the gain of the at least one amplifier 337 with a gain greater than zero is programmable.

Figure 7:
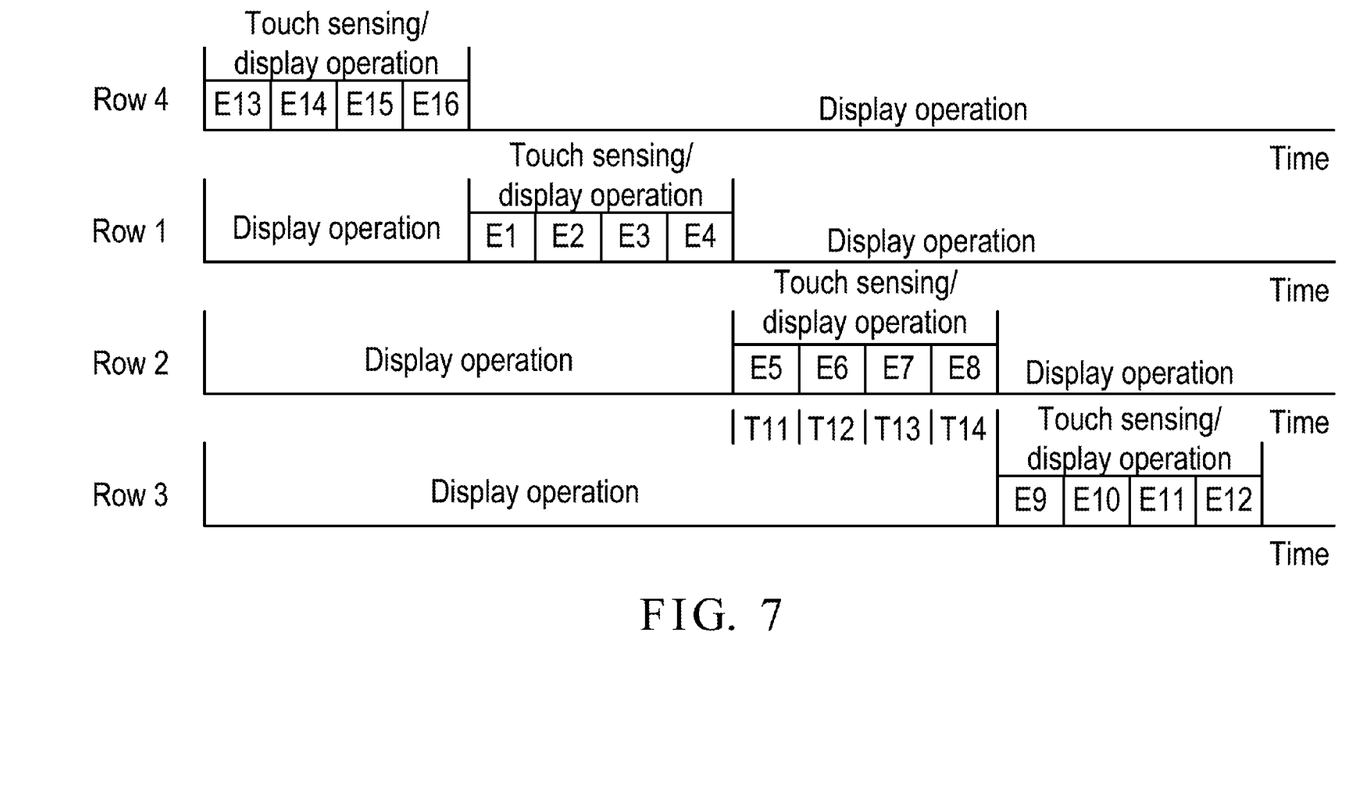
FIG. 7 schematically illustrates the timing of a display operation and a touch sensing operation.

FIG. 7 schematically illustrates the timing of the display operation and the touch sensing operation according to the invention. For convenient description, the common voltage and sensing electrodes 151 (E1-E4) are grouped as row 1, the common voltage and sensing electrodes 1 (E5-E8) are grouped as row 2, the common voltage and sensing electrodes 151 (E9-E12) are grouped as row 3, and the common voltage and sensing electrodes 151 (E13-E16) are grouped as row 4. As shown in FIG. 7, in time periods T11-T14, the touch sensing operation and the display operation are alternately performed on row 2, while the display operation is performed concurrently on row 1, row 3, and row 4. Further, in time period T12, the common voltage and sensing electrode 151 (E6) performs the touch sensing operation, and in this case the first terminal (a) of its touch selection switch circuit 333-6 is connected to the third terminal (c) thereof, while the first terminal (a) of each of the other touch selection switch circuits 333 is connected to the second terminal (b) thereof. Namely, in time period T12, only an area covered by the common voltage and sensing electrode 151 (E6) is defined as the touch sensing area, while the area covered by the other common voltage and sensing electrodes 151 (E1-E5, E7-E16) is defined as the display area. At this moment, the common voltage and sensing electrode 151 (E6) is provided with only the touch sensing signal applied by the touch sensing circuit, and the other common voltage and sensing electrodes 151 (E1-E5, E7-E16) are provided with both the common voltage signal applied by the display circuit and the reflective deflection signal applied by the touch circuit. In the invention, since there is no current loop existed between the display power supply 313 and the touch-dedicated power supply 331, the common voltage signal Vcom and the reflective deflection signal concurrently applied to the common voltage and sensing electrodes 151 (E1-E5, E7-E16) are not interfered with each other. That is, the display operation and the touch sensing operation can be concurrently performed without having any influence to each other. In time period T11, only the common voltage and sensing electrode 151 (ES) performs the touch sensing operation, while the other common voltage and sensing electrodes 151 (E1-E4, E6-E16) are provided for the display operation and also used as reflective deflection electrodes. In time period T13, only the common voltage and sensing electrode 151 (E7) performs the touch sensing operation. In time period T14, only the common voltage and sensing electrode 151 (E8) performs the touch sensing operation. Similarly, a desired number of common voltage and sensing electrodes 151 can be selected as the sensing electrode set 350 (such as every two of E1-E2, E3-E4 . . . E15-E16 or every four of E1-E2 and E5-E6, E3-E4 and E7-E8, and so on), so that the terminal (a) of each of the touch selection switch circuits 333 corresponding to the common voltage and sensing electrodes 151 of the sensing electrode set 350 is connected to the touch sensing signal at the terminal (c) for performing a touch sensing operation. The terminal (a) of each of the touch selection switch circuits corresponding to the other common voltage and sensing electrodes is connected to the terminal (b) thereof so as to perform a display operation and also function as a reflective deflection electrode. As to division of touch sensing and display areas, it can be sequentially or dynamically performed according to the area size and sensing sequence so as to increase the report rate and save the power consumption.

With reference to FIG. 3 again, the touch selection switch circuits 333 are field effect transistor (FET) circuits implemented in the touch circuit 330. In other embodiments, the touch selection switch circuits 333 can be thin film transistors (TFTs) implemented in the common voltage and sensing electrode layer 150.

Figure 8:
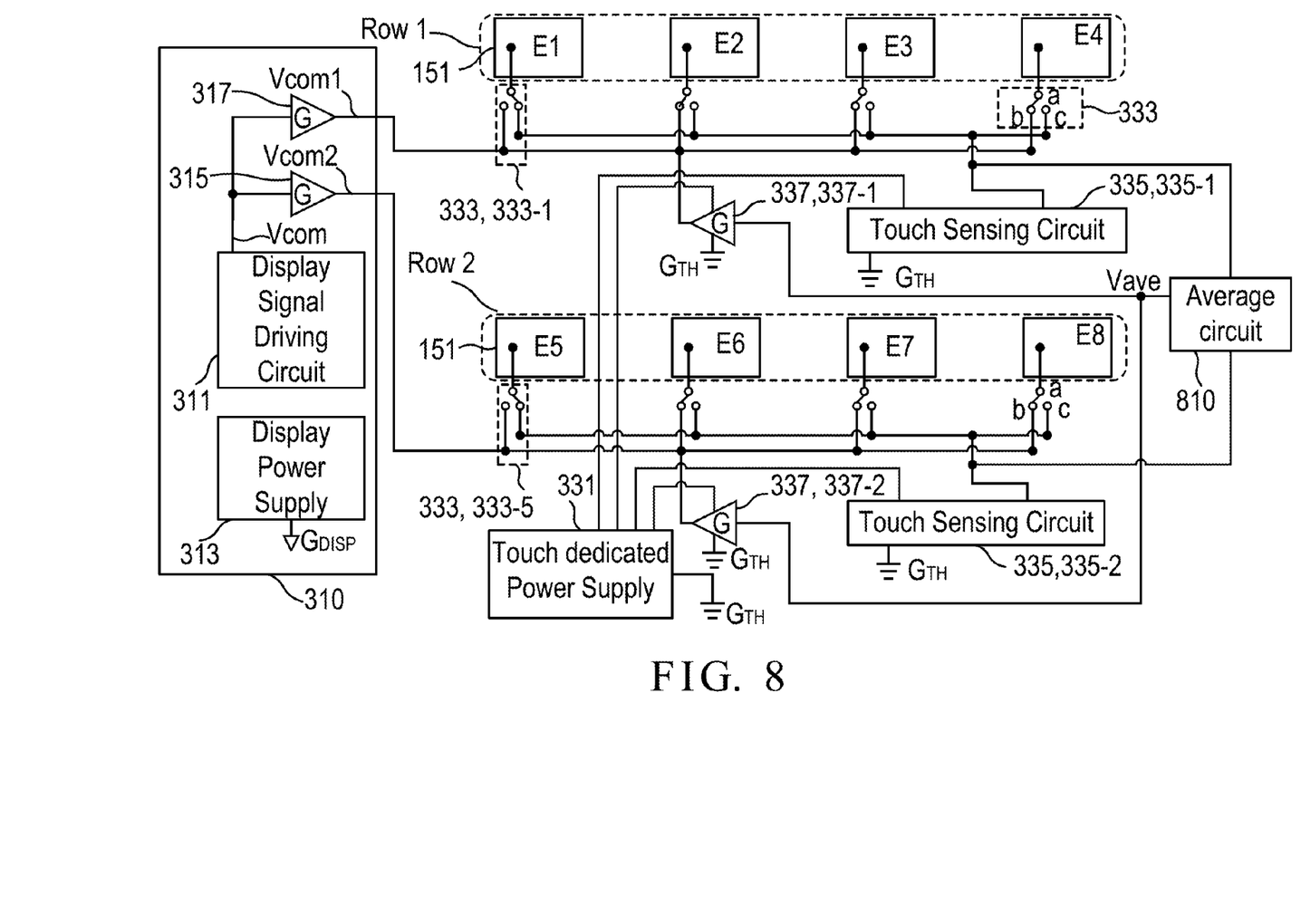
FIG. 8 is still another schematic view of a common voltage and sensing electrode layer, a display circuit, and a touch circuit according to the invention.

FIG. 8 is still another schematic view of the common voltage and sensing electrode layer 150, the display circuit 310, and the touch circuit 330 according to the invention. As shown in FIG. 8, the common voltage and sensing electrode layer 150 includes eight common voltage and sensing electrodes 151 that are divided into row 1 and row 2. The touch circuit 330 includes an independent touch-dedicated power supply 331, a plurality of touch selection switch circuits 333, two touch sensing circuits 335-1, 335-2, two amplifiers 337-1, 337-2 each with a gain greater than zero, and an average circuit 810.

As shown in FIG. 8, the touch sensing operation can be performed concurrently on row 1 and row 2. The first terminal (a) of the touch selection switch circuit 333-1 or 333-5 is connected to the third terminal (c) thereof, and the first terminal (a) of each of the other touch selection switch circuits 333 is connected to the second terminal (b) thereof. The common voltage and sensing electrode 151 (E1) at row 1 and the common voltage and sensing electrode 151 (E5) at row 2 can thus perform the touch sensing operation. In this case, the common voltage and sensing electrode 151 (E1) is the first sensing electrode set, and the common voltage and sensing electrodes 151 (E2-E4) form a first deflection electrode set corresponding to the first sensing electrode set. The common voltage and sensing electrode 151 (E5) is a second sensing electrode set and the common voltage and sensing electrodes 151 (E6-E8) form a second deflection electrode set corresponding to the second sensing electrode set. In FIG. 8, the first deflection electrode set (E2-E4) and the first sensing electrode set (E1) are drawn in the same row while the second deflection electrode set (E6-E8) and the second sensing electrode set (ES) are drawn in the same row simply for convenient description, but not for a limit. In practical application, the common voltage and sensing electrodes of the deflection electrode set are preferably arranged to surround the corresponding sensing electrode set.

As shown in FIG. 8, the touch selection switch circuits 333 couple electrical signals of the selected common voltage and sensing electrodes 151 (E1, E5) of more than one sensing electrode sets to the average circuit 810 for determining an average signal (Vave). The average signal (Vave) is coupled to the input terminals of the corresponding amplifiers 337-1, 337-2, and the reflective deflection signals outputted from the amplifiers 337-1, 337-2 are coupled to the first deflection electrode set (E2-E4) and the second deflection electrode set (E6-E8), respectively. At this moment, the display common voltage signals Vcom1 and Vcom2 originated from the amplifiers 315, 317 driven by the respective common voltage signals are electrically coupled to the first deflection electrode set and the second deflection electrode set. Namely, the electrodes (E2-E4 and E6-E8) of the two deflection electrode sets also perform the display operation when the two sensing electrode sets perform the touch sensing operation. Similarly, the touch selection switch circuits 333 can be used to select the common voltage and sensing electrodes 151 (E1-E2) as the first sensing electrode set and the common voltage and sensing electrodes 151 (E5-E6) as the second sensing electrode set; and to select the common voltage and sensing electrodes 151 (E3-E4) as the first deflection electrode set corresponding to the first sensing electrode set and the common voltage and sensing electrodes 151 (E7-E8) as the second deflection electrode set corresponding to the second sensing electrode set, and so on. The size of a sensing electrode set can be dynamically adjusted to meet with the desired resolution of a touch sensing or detection. In addition, the report rate of touch points can be further increased when selecting more than one sensing electrode sets.

As shown in FIG. 8, the amplifier 337-1 and the touch sensing circuit 335-1 are close to row 1, which is for illustrative purpose only, without implying that the amplifier 337-1 and the touch sensing circuit 335-1 have to be implemented in the common voltage and sensing electrode layer 150. In other embodiments, the amplifier 337-1 and the touch sensing circuit 335-1 can be implemented in the touch circuit 330.

Figure 9:
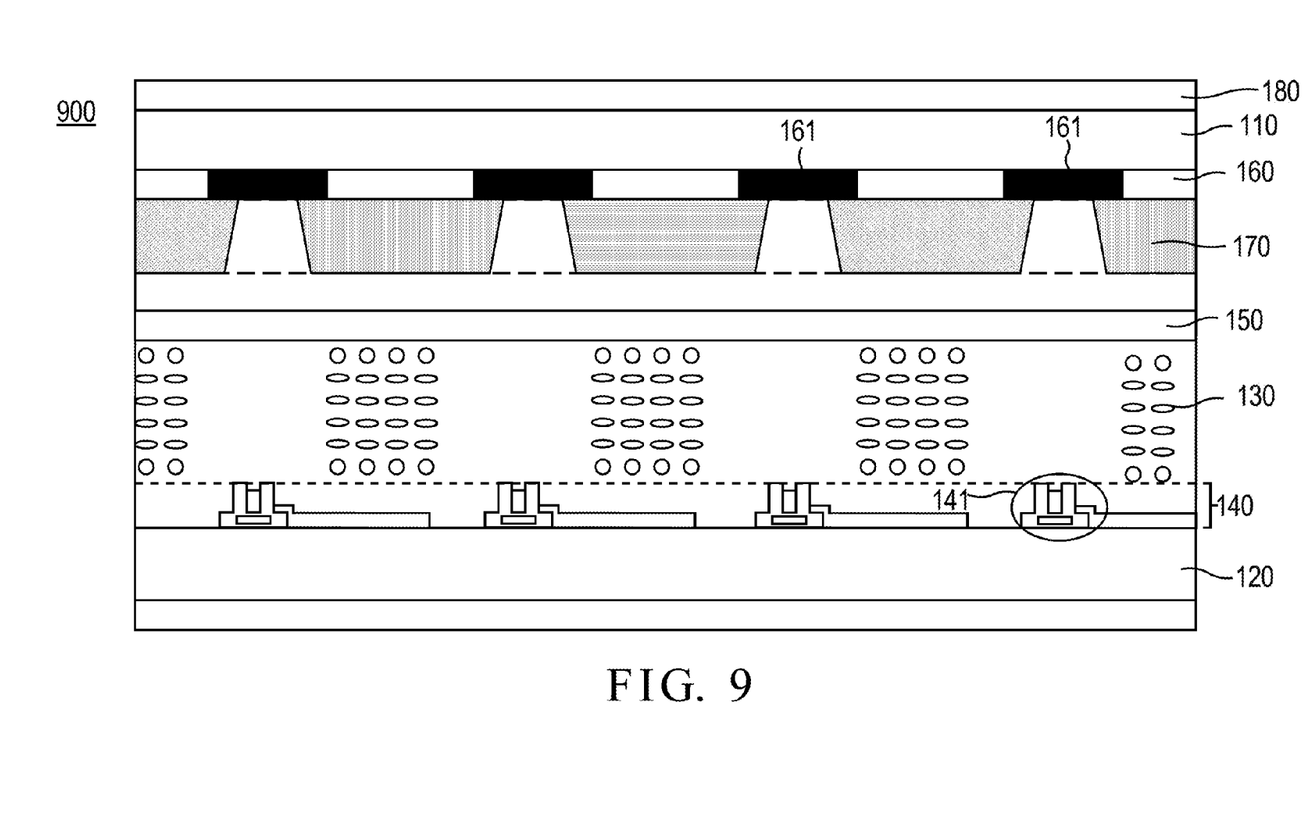
FIG. 9 schematically illustrates another stacked diagram of a high-sensitivity in-cell touch display device according to the invention.

FIG. 9 schematically illustrates another stacked diagram of a high-sensitivity in-cell touch display device 900 according to the invention. This embodiment is similar to that of FIG. 1 except that the common voltage and sensing electrode layer 150 is disposed between the first substrate 110 and the display material layer 130. This embodiment is commonly applied to the VA-type LCD panel.

For eliminating the disadvantages of the typical in-cell touch display panels, the invention provides a solution to perform touch sensing and display operations in parallel on difference areas so as to greatly increase the signal to noise rate (SNR). It overcomes the limitation in resolution and size for an in-cell touch screen and avoids the mutual interference problem on the touch and display operations, so that the report rate is relatively increased, and the operation accuracy and the display quality are improved.

As cited, in the present invention, the touch circuit is provided with the independent touch-dedicated power supply, and the common voltage and sensing electrode is used as a common node of the touch circuit and the display circuit. Thus, there is no current loop existed between the touch circuit and the display circuit, so that the relative voltage of the display circuit does not influence the relative voltage of the touch circuit. The present invention also provides reflection electrodes to reduce parasitic capacitance between the common voltage and sensing electrodes so as to improve the sensing distance, thereby providing relatively stable and consistent voltage for the common voltage and sensing electrode. Thus, disturbance to the display quality caused by the touch operation can be minimized. In addition, the display operation and the touch sensing operation can be performed on different areas in parallel to increase respective efficiencies of the display and touch sensing operations.

Although the present invention has been explained in relation to its preferred embodiment, it is to be understood that many other possible modifications and variations can be made without departing from the spirit and scope of the invention as hereinafter claimed.

What is claimed is:

1. A high-sensitivity in-cell touch display device, comprising:
    a first substrate;
    a second substrate arranged in parallel with the first substrate;
    a display material layer disposed between the first substrate and the second substrate;
    a thin film transistor layer arranged on one surface of the second substrate facing the display material layer and having a plurality of thin film transistors, a plurality of pixel electrodes, a plurality of gate driving lines, and a plurality of source driving lines;
    a common voltage and sensing electrode layer including a plurality of common voltage and sensing electrodes, each corresponding to one or more pixel electrodes, the common voltage and sensing electrodes being alternately grouped into a display area and a touch area, the display area and the touch area being respectively performed with a display operation and a touch sensing operation in parallel;
    a display circuit including:
    a display signal driving circuit, and
    a display power supply; and
    a touch circuit including:
    an independent touch-dedicated power supply, wherein there is no current loop between the independent touch-dedicated power supply and the display circuit in a touch sensing operation mode, and
    a plurality of touch selection switch circuits for sequentially or dynamically selecting a part of the common voltage and sensing electrodes as one or more sensing electrode sets;
    wherein the display circuit and the touch circuit apply a display common voltage signal to the common voltage and sensing electrodes of the display area, and a touch sensing signal to the common voltage and sensing electrodes of the touch area, respectively.

2. The high-sensitivity in-cell touch display device as claimed in claim 1, wherein each of the touch selection switch circuits is a field effect transistor circuit.

3. The high-sensitivity in-cell touch display device as claimed in claim 1, wherein each of the touch selection switch circuits is a thin film transistor circuit.

4. The high-sensitivity in-cell touch display device as claimed in claim 1, wherein each of the sensing electrode sets includes at least one common voltage and sensing electrode.

5. The high-sensitivity in-cell touch display device as claimed in claim 1, wherein the touch selection switch circuits further select at least one deflection electrode set from the common voltage and sensing electrodes that are not included in the sensing electrode set, and the at least one deflection electrode set includes at least one common voltage and sensing electrode.

6. The high-sensitivity in-cell touch display device as claimed in claim 5, wherein the deflection electrode set is composed of a plurality of common voltage and sensing electrodes surrounding a sensing electrode set corresponding to the deflection electrode set.

7. The high-sensitivity in-cell touch display device as claimed in claim 5, wherein the deflection electrode set is composed of all of the common voltage and sensing electrodes other than those included in the sensing electrode set corresponding to the deflection electrode set.

8. The high-sensitivity in-cell touch display device as claimed in claim 5, wherein the touch circuit further comprises at least one amplifier with a gain greater than zero.

9. The high-sensitivity in-cell touch display device as claimed in claim 8, wherein the touch selection switch circuits couple an electrical signal of a selected sensing electrode set to an input terminal of the corresponding at least one amplifier with a gain greater than zero, and couple a reflective deflection signal outputted from the at least one amplifier to the deflection electrode set.

10. The high-sensitivity in-cell touch display device as claimed in claim 8, wherein the touch selection switch circuits couple electrical signals of selected more than one sensing electrode sets to an average circuit for determining an average signal, then couple the average signal to input terminals of corresponding amplifiers, and couple reflective deflection signals outputted by the corresponding amplifiers to the deflection electrode set.

11. The high-sensitivity in-cell touch display device as claimed in claim 8, wherein the gain of the at least one amplifier is programmable.

12. The high-sensitivity in-cell touch display device as claimed in claim 1, wherein the common voltage and sensing electrode layer is disposed between the second substrate and the display material layer.

13. The high-sensitivity in-cell touch display device as claimed in claim 1, wherein the common voltage and sensing electrode layer is disposed between the first substrate and the display material layer.

14. The high-sensitivity in-cell touch display device as claimed in claim 1, wherein the display material layer is a liquid crystal layer.

15. The high-sensitivity in-cell touch display device as claimed in claim 1, wherein the independent touch-dedicated power supply is coupled to the display power supply and other functional circuits through a specific switching device in a non-touch operation mode, so as to send a synchronous message and touch information or perform a power charging operation.

* * * * *